United States Patent [19]

Nishikawa et al.

[11] Patent Number: 5,463,475
[45] Date of Patent: Oct. 31, 1995

[54] SEMICONDUCTOR DELAY LINE DRIVEN BY AN INPUT SIGNAL-DERIVED REFERENCE SIGNAL

[75] Inventors: Tetsuo Nishikawa, Miyagi; Tatsuya Hagiwara, Miyagi, both of Japan

[73] Assignee: Fuji Photo Film Co., Ltd., Kanagawa, Japan

[21] Appl. No.: 939,739

[22] Filed: Sep. 2, 1992

[30] Foreign Application Priority Data

Sep. 13, 1991 [JP] Japan ................. 3-235156

[51] Int. Cl.⁶ ................. H04N 5/95; H04N 5/89
[52] U.S. Cl. ................. 358/325; 358/326; 348/506
[58] Field of Search ................. 358/19, 17, 148, 358/325, 326; 360/36.1, 36.2; 307/607; 328/66, 67; 348/505, 506, 518, 500; H04N 9/45, 9/83, 9/84, 9/89, 5/95, 5/953

[56] References Cited

U.S. PATENT DOCUMENTS

| | | | |
|---|---|---|---|
| 4,195,309 | 3/1980 | Todd et al. | 358/329 |
| 4,313,129 | 1/1982 | Fukui | 358/325 |
| 4,460,926 | 7/1984 | Nakamuta | 358/325 |
| 4,561,013 | 12/1985 | Fukui et al. | 358/326 |
| 4,647,984 | 3/1987 | Suzuki et al. | 358/326 |
| 4,688,103 | 8/1987 | Akiyama | 358/325 |
| 4,930,003 | 5/1990 | Hosoya | 358/19 |
| 5,109,285 | 4/1992 | Koga | 358/325 |

FOREIGN PATENT DOCUMENTS

| | | | |
|---|---|---|---|
| 52-55340 | 5/1977 | Japan | 358/19 |
| 53-30822 | 3/1978 | Japan | 358/19 |
| 0145488 | 9/1982 | Japan | 360/36.1 |
| 206187 | 12/1982 | Japan | 358/19 |
| 0027691 | 2/1984 | Japan | 358/19 |
| 228788 | 10/1986 | Japan | H04N 5/95 |
| 239684 | 10/1987 | Japan | H04N 5/95 |
| 13189 | 1/1990 | Japan | H04N 5/95 |
| 294179 | 12/1990 | Japan | H04N 5/95 |
| 0114379 | 5/1991 | Japan | H04N 5/95 |

Primary Examiner—James J. Groody
Assistant Examiner—Chris Grant
Attorney, Agent, or Firm—Sughrue, Mion, Zinn, Macpeak & Seas

[57] ABSTRACT

A method of driving a CCD semiconductor delay line capable of providing a good delay characteristic without externally supplying a clock signal. An intermittent reference signal is extracted from the color burst signal of an inputted television signal. Using the intermittent reference signal, a continuous reference signal is generated by a phase locked loop. The continuous reference signal drives a CCD semiconductor delay line to delay the television signal.

7 Claims, 5 Drawing Sheets

FIG. IA
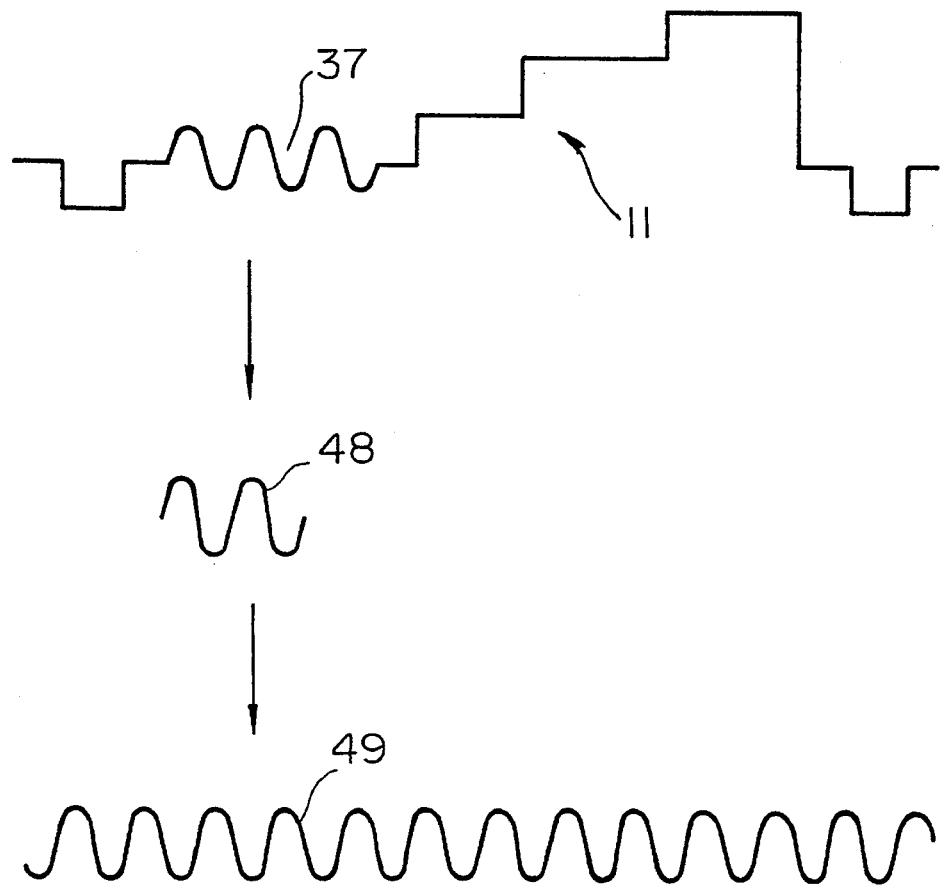
FIG. IB
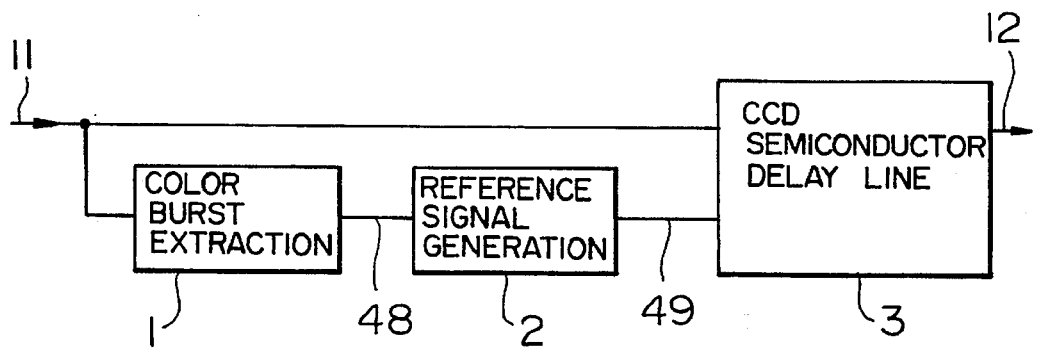

SEMICONDUCTOR DELAY LINE DRIVEN BY AN INPUT SIGNAL-DERIVED REFERENCE SIGNAL

BACKGROUND OF THE INVENTION a) Field of the Invention

The present invention relates to a delay line for delaying image information, and more particularly to driving a delay line using a semiconductor charge coupled device (CCD) for delaying image information.

b) Description of the Related Art

Delay lines are used in televisions in order to obtain a high quality of images while deriving color and luminance information from video signals. The delay time and delay characteristics are dependent upon the structure and material of a delay line. In place of a glass delay line having some problem of delay characteristics, CCD semiconductor delay lines have been used for delaying an input signal by 1 H (or 0.5 H).

FIG. 5 shows the structure of such a CCD semiconductor delay line. A CCD semiconductor delay line 101 is supplied with power sources VDD and VSS. An input signal 102, a reference signal 103 and a DC bias are also supplied to the delay line 101. The input signal is delayed by some period determined by the frequency of the reference signal 103 and the number of stages of the delay line, to provide a delayed output signal 105.

Such a CCD semiconductor delay line has excellent characteristics. However, it is necessary to externally supply a reference signal. The analog circuit system for a video signal is required to have a circuit for generating a clock signal.

SUMMARY OF THE INVENTION

It is an object of the present invention to provide a method of driving a semiconductor delay line apparatus having a good delay characteristic without externally supplying a clock signal.

It is another object of the present invention to provide a semiconductor delay line apparatus allowing a good delay characteristic without externally supplying a clock signal.

According to an aspect of the present invention, there is provided a method of driving a semiconductor delay line comprising the steps of: inputting a television signal and deriving an intermittent reference signal from a color burst signal of the television signal; generating a continuous reference signal from the intermittent reference signal; and driving a CCD semiconductor delay line by using the continuous reference signal, and delaying the television signal.

A television signal contains a color burst signal having a frequency substantially the same as that of the subcarrier signal. If an intermittent reference signal is extracted from the burst signal, the extracted intermittent reference signal has the same characteristic as the subcarrier signal.

If a continuous reference signal is generated from the intermittent reference signal extracted from the color burst signal, this continuous reference signal has the same characteristics as the continuous subcarrier signal. Using this continuous reference signal, a CCD semiconductor delay line can be reliably driven.

It is therefore possible to drive a CCD semiconductor delay line by generating a continuous reference signal from the input signal itself, without externally supplying a reference signal.

BRIEF DESCRIPTION OF THE DRAWINGS

FIGS. 1A and 1B show an embodiment of the present invention, FIG. 1A shows examples of waveforms explaining a method of driving a semiconductor delay line apparatus, and FIG. 1B is a block diagram of-the semiconductor delay line.

DESCRIPTION OF THE PREFERRED EMBODIMENTS

Figure 2:
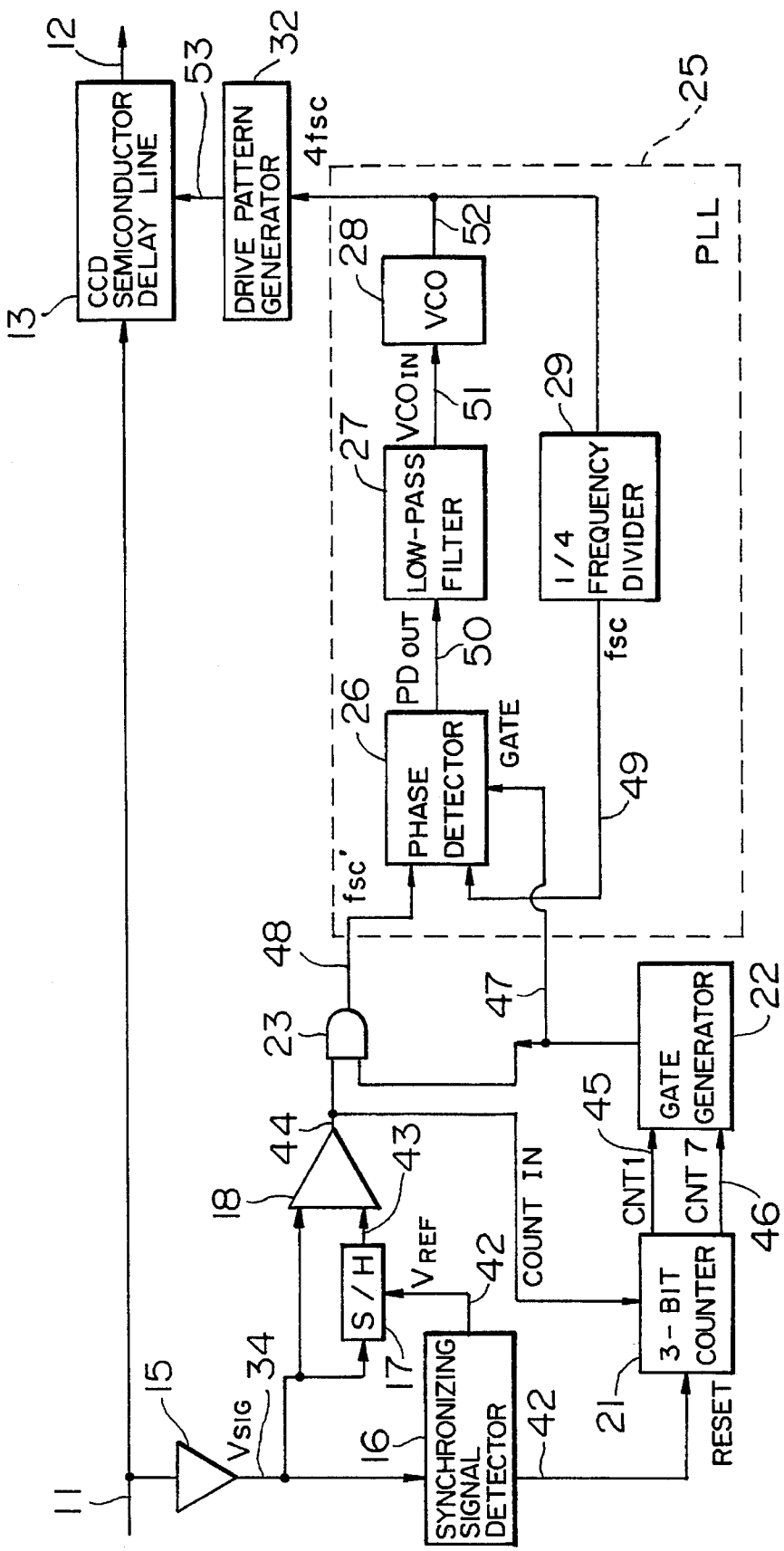
FIG. 2 is a block diagram showing the details of the semiconductor delay line apparatus of the embodiment.

FIGS. 1A and 1B show an embodiment according to the present invention. FIG. 1A shows examples of waveforms explaining a method of driving a semiconductor delay line apparatus. Referring to FIG. 1A, a television signal 11 given at the uppermost diagram of FIG. 1A partially contains a color burst signal 37. The color burst signal 37 is extracted from the television signal 11 to obtain an intermittent reference signal 48 given at the middle diagram of FIG. 1A.

This intermittent signal is used for generating a continuous reference signal 49 given at the lowermost diagram of FIG. 1A. This continuous reference signal 49 has substantially the same frequency as that of the subcarrier signal. A proper delay characteristic can therefore be obtained by driving a CCD semiconductor delay line with such a continuous reference signal 49.

FIG. 1B shows the structure of a semiconductor delay line apparatus applied to which is the method of driving a semiconductor delay line apparatus, such as described with FIG. 1A. A television signal 11 is applied to a CCD semiconductor delay line 3, delayed by a predetermined time, and outputted as a delayed signal 12.

The television signal 11 is also applied to a color burst extractor 48 to extract a color burst signal from the television signal 11. This extracted intermittent reference signal 48 is converted into a continuous reference signal 49 by a reference signal generator 2. The CCD semiconductor delay line 3 is driven by the continuous reference signal 49.

The reference signal extracted from the input television signal itself is used for driving the CCD semiconductor delay line 3, so that a drive reference signal is not required to be externally supplied. The reference signal of this embodiment has substantially the same frequency as that of the subcarrier signal, thereby providing a proper delay characteristic.

FIG. 2 shows the detailed structure of the semiconductor delay line apparatus according to the embodiment of this invention. An input signal 11 is supplied to a CCD semiconductor delay line 13, and outputted as a signal 12 given a predetermined delay time. The CCD semiconductor delay line 13 is driven by a reference signal 53 having a predetermined frequency. This reference signal 53 is generated in the following manner.

The input signal 11 supplied to the CCD semiconductor delay line 13 is also supplied to a buffer 15. The buffer 15 supplies its output signal Vsig 34 to one input terminal of a comparator 18, to an input terminal of a sample/hold circuit 17, and to a synchronizing signal detector 16. The signal Vsig 34 has a waveform given at the uppermost diagram in FIG. 4. The signal Vsig has a horizontal synchronizing signal 35 at the start of one horizontal scan period, followed by a pedestal 36, color burst 37, and video signal 38 in this order.

Figure 4:
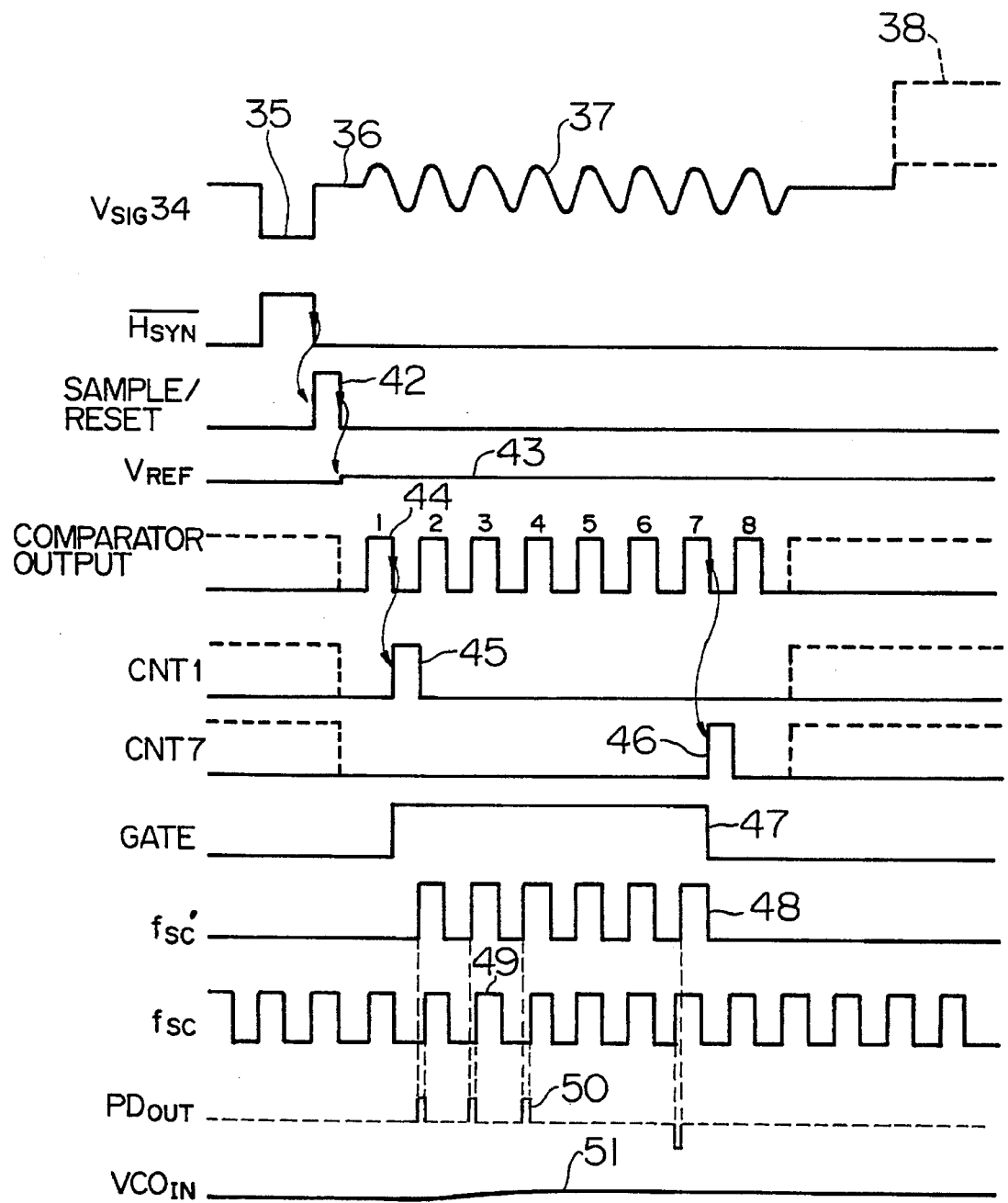
FIG. 4 shows signal waveforms at main portions of the circuit shown in FIG. 2.
Figure 5:
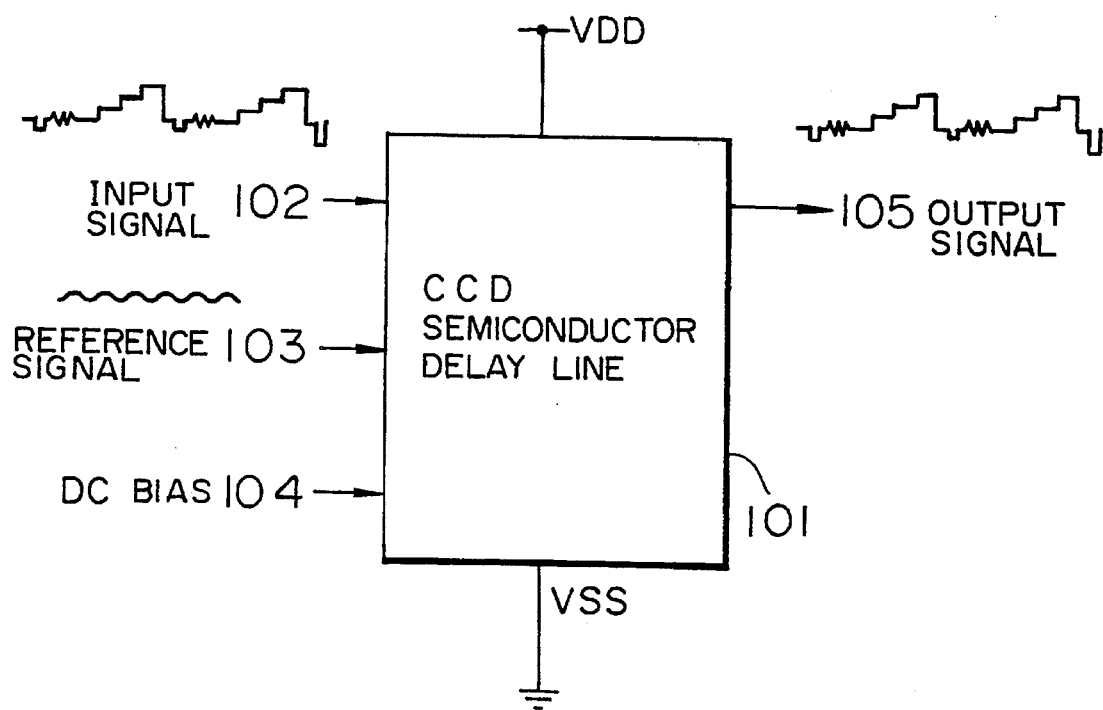
FIG. 5 is a block diagram showing the structure of a conventional semiconductor delay line.

The synchronizing signal detector 16 detects the horizontal synchronizing signal 35, and generates a signal Hsyn such as given in the second diagram of FIG. 4, the signal Hsyn being an inversion of the horizontal synchronizing signal 35. The falling edge of the signal Hsyn is detected to generate a sample/reset signal 42 such as given in the third diagram of FIG. 4.

This sample/reset signal 42 is applied to the sample-and-hold circuit 17 which samples and holds the pedestal portion 36 of the inputted television signal. Thus, a reference voltage Vref 43 (refer to the fourth diagram of FIG. 4) is generated, the level of this voltage being determined by the level of the pedestal portion. The synchronizing signal detector 16 also supplies the sample/reset signal to a 3-bit counter 21.

The comparator 18 compares the reference voltage 43 holding the pedestal portion level, with the television signal 34, to generate a signal changing its level between "0" and "1" depending upon the comparison results. The color burst signal 37 of the television signal 34 is a sine wave signal alternately changing its amplitude in positive and negative directions relative to the level of the pedestal portion 36.

An output of the comparator 18 has therefore a rectangular waveform such as given in the fifth diagram of FIG. 4, having the same frequency as that of the color burst signal 37. This rectangular waveform is applied to an AND gate 23 and the 3-bit counter 21.

The 3-bit counter 21 is reset by the sample/reset signal 42, and counts the number of pulses outputted from the comparator 18. The 3-bit counter 21 generates a first pulse signal 45 and a seventh pulse signal 46 (refer to the sixth and seventh drawings of FIG. 4) when the comparator 18 supplies its first and seventh pulses.

These pulse signals 45 and 46 are supplied to a gate generator 22 which generates a gate signal 47 (refer to the eighth diagram of FIG. 4), the gate signal rising at the rising edge of the first pulse signal 45 and falling at the rising edge of the seventh pulse signal 46.

The AND gate 23 outputs a level "1" signal when an output 44 from the comparator 18 and the gate signal 47 from the gate generator 22 are both "1", and outputs a level "0" signal when one of them is "0". Therefore, an intermittent reference signal $f_{sc}'$ 48 given in the ninth diagram of FIG. 4 is generated.

The color burst signal 37 generally continues during eight or more periods of the subcarrier. In the example shown in FIG. 8, the start and last periods of the color burst signal are not used for generating the intermittent reference signal $f_{sc}'$ with six pulses. This intermittent reference signal 48 is supplied to a phase locked loop (PLL) circuit 25.

The PLL circuit 25 includes a phase detector 26, a low-pass filter 27 and a voltage controlled oscillator (VCO) 28, and generates a continuous reference signal $4f_{sc}$ using the intermittent reference signal $f_{sc}'$. The continuous reference signal $4f_{sc}$ has a frequency four times higher than that of the intermittent reference signal $f_{sc}'$. The output signal $4f_{sc}$ is fed back to the phase detector 26 via a ¼ frequency divider 29. Therefore, the output signal $4f_{sc}$ divided by 4 by the ¼ frequency divider 29, represented by $f_{sc}$ 49, is fed back to the phase detector 26. The phase detector 26 output PDout corresponds to a phase difference between two input signals $f_{sc}'$ and $f_{sc}$. This signal PDout is smoothed by the low-pass filter 27 and controls the oscillation frequency of VCO 28.

Figure 3:
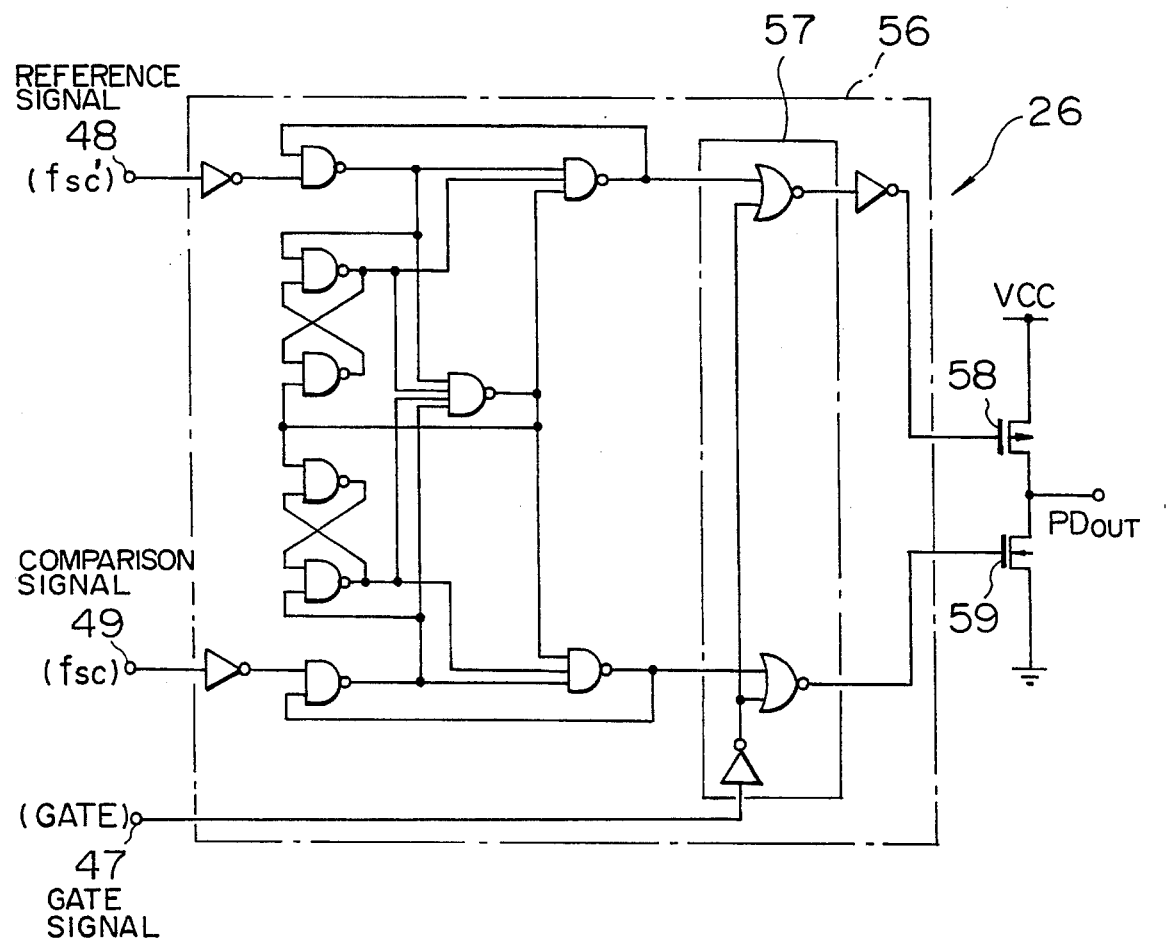
FIG. 3 is a circuit diagram showing the detailed structure of the phase detector shown in FIG. 2.

The structure of the phase detector 26 is shown in FIG. 3.

In FIG. 3, a phase detecting circuit 56 compares the phases of two input signals, i.e., reference signal $f_{sc}'$ and comparison signal $f_{sc}$. The phase detecting circuit 56 has a gate circuit 57 including two NOR gates to thereby allow phase comparison only during the period determined by the gate signal 47.

Specifically, while the intermittent reference signal 48 ($f_{sc}'$) is present, the gate signal 47 (Gate) takes a level "1" and its inverted signal takes a level "0". During this period, the two NOR gates of the gate circuit 57 inverts and outputs their input signals.

When the gate signal 47 takes the level "0" and its inverted signal takes the level "1", outputs of the NOR gates take the level "1". During this period, two MOS transistors 58 and 59 connected to the phase detecting circuit 56 maintain turned off and their output terminal PDout enters a high impedance state.

Returning back to FIG. 2, if there is a phase shift between two input signals, the phase detector 26 generates its output signal PDout 50 corresponding to the phase difference, having a waveform given in the second lowermost diagram of FIG. 4. This phase detector output 50 is supplied to the low-pass filter 27 for generation of the input signal 51 to the voltage controlled oscillator 28. Namely, the input signal 51 to the voltage controlled oscillator 28 has a d.c. voltage changing with the phase difference.

The oscillation waveform of the voltage controlled oscillator 28 changes in accordance with the input voltage signal, and a signal is obtained which has a phase changing with the reference signal. In the example shown in FIG. 4, the reference signal $4f_{sc}$ having a frequency four times higher than that of the input reference signal $f_{sc}'$ is generated in order to four-phase drive the CCD semiconductor delay line 12. Instead, the reference signal may be generated as having a frequency same as, two times higher than, that of the input reference signal, or other frequencies. If the frequency is to be changed, the frequency divider is changed correspondingly.

During the period while the reference signal $f_{sc}'$ is not present, the output terminal of the phase detector 26 enters a high impedance state and the voltage controlled oscillator 28 continues to operate under the previous condition. Therefore, during the period while the reference signal is not present, a signal having the same phase continues to be supplied to a drive pattern generator 32. The drive pattern generator 32 generates a four-phase drive signal 53 for driving the CCD semiconductor delay line 13. If the delay line 13 is formed by another type of CCDs, the drive pattern generator 32 is arranged to generate a drive signal suitable for the selected type.

In the manner described above, a continuous reference signal for driving a CCD semiconductor delay line can be generated by extracting from a television signal an intermittent reference signal and changing the intermittent reference signal to the continuous reference signal. With such an arrangement, without externally supplying a reference signal, a semiconductor delay line can be driven reliably.

The present invention has been described in connection with the preferred embodiments. The present invention is not intended to be limited only to the above-described embodiments. It is obvious that person skilled in this field of art can make various modifications, improvements, combinations and the like.

We claim:

1. A method of driving a semiconductor delay line comprising the steps of:

inputting a television signal and deriving an intermittent reference signal from a color burst signal of said television signal;

generating a continuous reference signal from said intermittent reference signal; and driving a CCD semiconductor delay line by using said continuous reference signal, and delaying said television signal;

wherein said step of deriving said intermittent reference signal includes a step of detecting a synchronizing signal of said television signal, holding a level of a pedestal signal of said television signal based on the detected synchronizing signal, comparing a level of said color burst signal with a level of said pedestal signal, and generating a predetermined number of synchronous pulses.

2. A method according to claim 2, wherein said step of generating said continuous reference signal includes a step of driving a phase locked loop circuit inclusive of a voltage controlled oscillator, by using said intermittent reference signal.

3. A method according to claim 3, wherein said voltage controlled oscillator is driven in accordance with a difference between said intermittent reference signal and a signal obtained by feeding back an output of said phase locked loop circuit.

4. A method of driving a semiconductor delay line comprising the steps of:

inputting a television signal and deriving an intermittent reference signal exclusively from a color burst signal and a synchronizing signal of said television signal;

generating a continuous oscillating reference signal exclusively from said intermittent reference signal and said synchronizing signal; and driving a CCD semiconductor delay line exclusively by using said continuous reference signal, and delaying said television signal, wherein said step of generating said continuous reference signal includes a step of holding an input voltage to a voltage controlled oscillator while said intermittent reference signal is not present.

5. A semiconductor delay line apparatus comprising:

means for inputting a television signal and deriving an intermittent reference signal from a color burst signal of said television signal;

means for generating a continuous reference signal from said intermittent reference signal; and a CCD semiconductor delay line driven by said continuous reference signal for delaying said television signal;

wherein said means for deriving said intermittent reference signal includes means for holding a level of a pedestal signal of said television signal and comparing a level of said color burst signal with a level of said pedestal signal.

6. An apparatus according to claim 5, including gate means for supplying an output of said means for holding and comparing during a predetermined period.

7. A semiconductor delay line apparatus comprising:

means for inputting a television signal and deriving an intermittent reference signal exclusively from a color burst signal and a synchronizing signal of said television signal;

means for generating a continuous oscillating reference signal exclusively from said intermittent reference signal and said synchronizing signal; and a CCD semiconductor delay line driven exclusively by said continuous reference signal for delaying said television signal, wherein said means for generating said continuous reference signal includes means for holding, while said intermittent reference signal is not present, the phase of said continuous reference signal.

* * * * *